US008565490B2

(12) United States Patent
Krien

(10) Patent No.: US 8,565,490 B2

(45) **Date of Patent: *Oct. 22, 2013**

(54) COMPUTERIZED IMAGING OF SPORTING TROPHIES AND METHOD OF PROVIDING A REPLICA

(76) Inventor: David A. Krien, Hays, KS (US)

( * ) Notice: Subject to any disclaimer, the term of this patent is extended or adjusted under 35 U.S.C. 154(b) by 1483 days.

This patent is subject to a terminal disclaimer.

(21) Appl. No.: 11/942,045

(22) Filed: Nov. 19, 2007

(65) Prior Publication Data

US 2008/0063885 A1 Mar. 13, 2008

Related U.S. Application Data

(63) Continuation-in-part of application No. 11/700,360, filed on Jan. 31, 2007, now abandoned, which is a continuation of application No. 11/170,573, filed on Jun. 29, 2005, now Pat. No. 8,355,885.

(60) Provisional application No. 60/584,908, filed on Jul. 1, 2004.

(51) Int. Cl.
*G06K 9/00* (2006.01)

(52) U.S. Cl.
USPC ......... 382/110; 382/154; 428/542.4; 702/155

(58) Field of Classification Search
USPC ......... 382/100, 154, 110; 428/542.4; 702/155
See application file for complete search history.

(56) References Cited

U.S. PATENT DOCUMENTS 4,753,031 A * 6/1988 Owen ............................ 43/54.1
4,839,675 A * 6/1989 Owen ........................... 396/429
5,412,420 A * 5/1995 Ellis ............................. 348/135
5,483,441 A * 1/1996 Scofield .......................... 700/90
5,576,949 A * 11/1996 Scofield et al. ............... 702/179
5,983,552 A * 11/1999 Nelson ................................ 43/2
6,003,228 A * 12/1999 Riggio ....................... 29/896.41
6,377,353 B1 * 4/2002 Ellis ............................. 356/603
6,542,249 B1 * 4/2003 Kofman et al. ............... 356/601
6,549,289 B1 * 4/2003 Ellis ............................. 356/603
6,877,460 B1 * 4/2005 Ellis ............................. 119/842
6,959,499 B2 * 11/2005 Bini ............................... 33/511
6,974,373 B2 * 12/2005 Kriesel ......................... 452/157
7,039,220 B2 * 5/2006 Kriesel ......................... 382/110
7,044,846 B2 * 5/2006 Eilertsen ....................... 452/161
7,128,024 B2 * 10/2006 Doyle, II ....................... 119/518
7,399,220 B2 * 7/2008 Kriesel et al. ................ 452/157
7,853,046 B2 * 12/2010 Sharony ........................ 382/110
8,036,429 B2 * 10/2011 Doyle, II ....................... 382/110
2002/0170201 A1 * 11/2002 Trout et al. ..................... 33/773
2003/0024481 A1 * 2/2003 Kalscheur et al. ............ 119/174
2003/0115265 A1 * 6/2003 Kitade et al. .................. 709/203
2003/0173743 A1 * 9/2003 Brink et al. ................... 273/297
2004/0157527 A1 * 8/2004 Omar ........................... 446/268

(Continued)

*Primary Examiner* — Aaron W Carter

(74) *Attorney, Agent, or Firm* — Hall Estill Law Firm

(57) ABSTRACT

Methods are disclosed for providing replicas of a sporting trophy and for scoring the sporting trophy. The first method includes providing a sporting trophy to be scanned; scanning the sporting trophy to provide three-dimensional image data of the sporting trophy; and providing the three-dimensional image data of the sporting trophy to a replica generating system to provide a replica of the sporting trophy. The second method includes providing three-dimensional digital data of a sporting trophy having a volume and a surface area; providing at least one sporting-relevant measurement based on the three-dimensional data of the sporting trophy; and providing a score of the sporting trophy based on the at least one sporting-relevant measurement.

19 Claims, 4 Drawing Sheets

(56) References Cited

U.S. PATENT DOCUMENTS

2004/0163267 A1* 8/2004 Bini ................................ 33/511
2005/0011466 A1* 1/2005 Doyle, II ....................... 119/518
2005/0014461 A1* 1/2005 Eilersten ....................... 452/161
2005/0123883 A1* 6/2005 Kennen et al. .................. 434/11
2005/0153359 A1* 7/2005 Schaefer et al. ............... 435/7.1
2005/0211174 A1* 9/2005 Ellis ........................... 119/14.08
2005/0257748 A1* 11/2005 Kriesel et al. .............. 119/51.02
2006/0005460 A1* 1/2006 Bittrick .......................... 43/43.4
2006/0126903 A1* 6/2006 Sharony ........................ 382/110
2007/0022967 A1* 2/2007 Doyle, II ....................... 119/416
2007/0045010 A1* 3/2007 Kasperek ...................... 177/148
2007/0110281 A1* 5/2007 Jurk ............................. 382/110
2008/0140234 A1* 6/2008 Shafter ........................... 700/91
2008/0273760 A1* 11/2008 Metcalfe et al. .............. 382/110
2010/0289879 A1* 11/2010 Sinzinger et al. ............... 348/46
2011/0196661 A1* 8/2011 Spicola et al. .................. 703/11
2011/0279650 A1* 11/2011 Liao et al. ....................... 348/46
2011/0311109 A1* 12/2011 Demarais et al. ............. 382/110

* cited by examiner

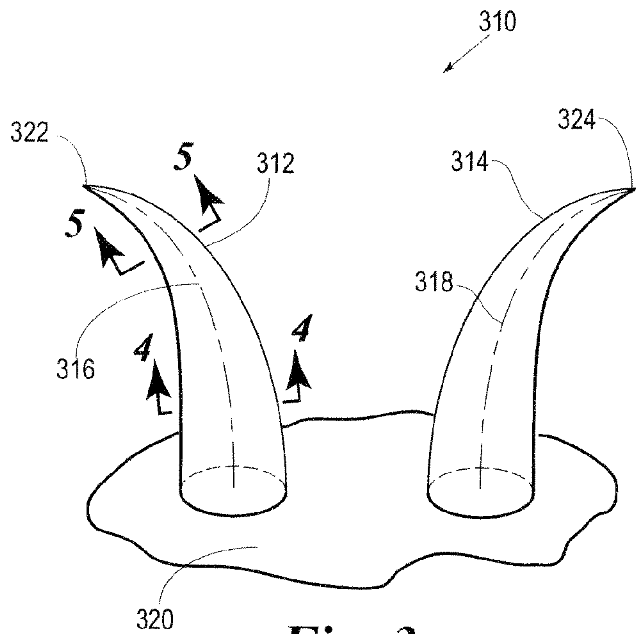
Fig. 3
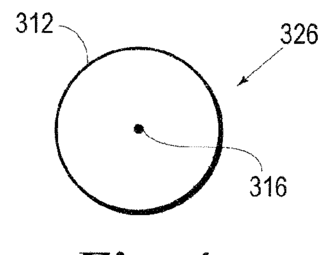
Fig. 4
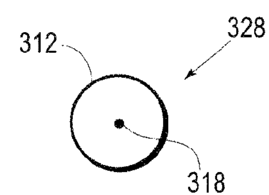
Fig. 5
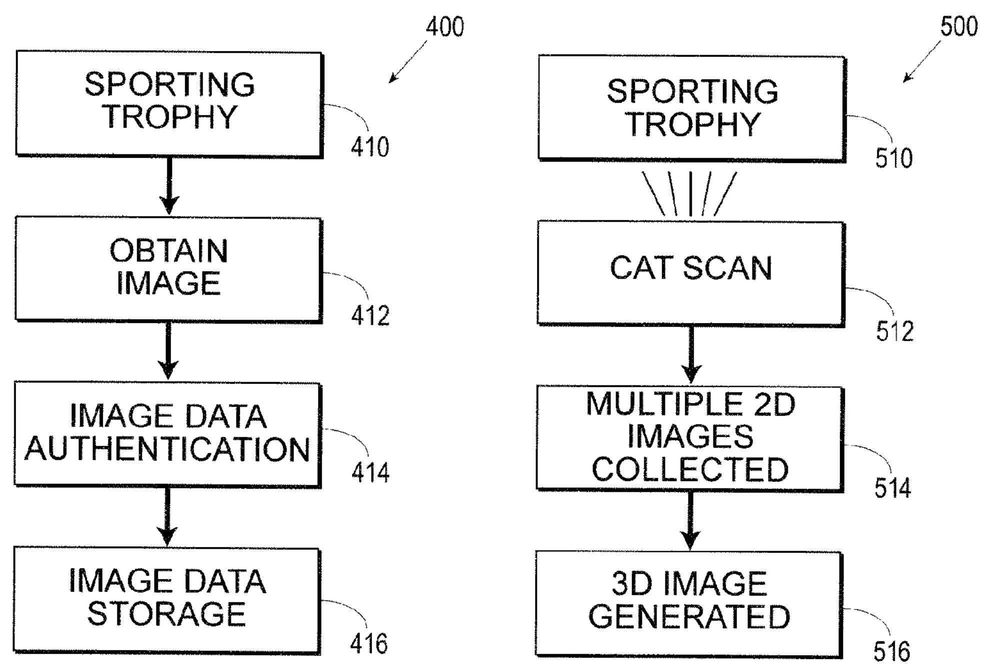
Fig. 6
Fig. 7

COMPUTERIZED IMAGING OF SPORTING TROPHIES AND METHOD OF PROVIDING A REPLICA

CROSS REFERENCE TO RELATED APPLICATIONS

This application is a continuation-in-part of U.S. Ser. No. 11/700,360, filed on Jan. 31, 2007 now abandoned, which claims the benefit of continuation application U.S. Ser. No. 11/170,573, filed on Jun. 29, 2005 now U.S. Pat. No. 8,355,885, which claims the benefit of U.S. provisional patent application Ser. No. 60/584,908, filed Jul. 1, 2004, the content of both are hereby incorporated by reference in its entirety.

STATEMENT REGARDING FEDERALLY SPONSORED RESEARCH OR DEVELOPMENT

Not Applicable.

BACKGROUND OF THE INVENTION

Devices are known for creating three dimensional ("3D") image representations of items having complex shapes. For example, ShapeGrabber Inc. of Ottawa, Ontario, Canada designs, manufacturers and markets 3D laser scanners and 3D laser digitizers for 3D inspection, modeling and reverse engineering. The same company provides scanner services on a project basis. Because of their high-tech and costly nature 3D imaging systems, such as ShapeGrabber, are generally limited to industrial and business applications due to their higher cost.

The technology that the typical sportsman (e.g., a hunter, a trapper, a fisherman) possesses is generally limited to much less costly devices, such as Global Positioning System (GPS) systems. Further, in the process of recording and display of sporting trophies, or portions thereof, sportsmen generally rely on relatively primitive means such as having a mount of the original animal, or portion thereof, created. Further, sportsmen often use hand measurements to implement trophy scoring systems for comparison, categorization, and/or ranking of their sporting trophy. As defined herein "sporting trophy" means any non-living biological specimen obtained by a sportsman while engaged in their sport.

Most sportsmen (e.g., hunters, fishermen) participate in their respective sports with the goal of catching or taking animals with specific characteristics. On the occasion of acquiring a trophy animal (e.g., a deer with a large set of antlers, a fish with a great weight and/or length), sportsmen typically seek to record and display their achievements. This is generally done through the use of "mounts" (i.e., taking the trophy to a taxidermist) of their sporting trophy and in some circumstances with the use of scoring systems for comparison and ranking. However, this process requires that the original, or at least a mold thereof, be utilized. Thus, in cases of intentional or accidental disposal (e.g., through destruction or theft) of the original sporting trophy, a sportsman is unable to replace the trophy with an identical copy. Additionally, if the sporting trophy is damaged or otherwise flawed, the resulting mount, or mold thereof, would also contain the defects of the original.

Another major aspect related to sporting trophies pertains to scoring and ranking systems. For many years, sportsmen have been utilizing scoring systems to establish a numerical basis for categorizing and ranking sporting trophies such as antlers (e.g., whitetail deer antlers, elk antlers, moose antlers). Examples of such systems, illustratively in the context of deer antlers, include the Boone and Crocket, and the Pope and Young Score Charts. Determining the score of a set of deer antlers using the Boone and Crockett Scoring system, as well as other scoring systems, generally comprises measuring various characteristics such as the length and spacing of each tine, and the length and circumference of the main rack beams. Further, many scoring systems for sporting trophies comprise a number of categories (e.g., typical and non-typical antlers), each of which may be scored differently. For example, antlers ranked in the "typical" categories are given a higher score for symmetry.

As a result, the process of measuring and scoring sporting trophies is very labor intensive and requires precise measurement. The determination of accurate and consistent scores is very time-consuming and difficult as a great number of characteristics must be taken into account. The implementation of conventional scoring systems by hand leads to the possibility of error and/or ambiguity resulting from human error and/or lack of precision. Thus, there exists a need to implement economical and consistent systems of scoring sporting trophies. Further, a consistent, economical, and precise means for reproduction and/or analysis of portions of animals for sportsmen is needed.

SUMMARY OF THE INVENTION

A method of generating and storing three-dimensional digital data indicative of a sporting trophy is provided. The method may be implemented in relation to a wide variety of sporting trophy applications. A sportsman can provide a sporting trophy to a scanning system to obtain three-dimensional image data relative to the sporting trophy. Sporting-relevant measurements can be computed based on the stored three-dimensional image data.

BRIEF DESCRIPTION OF THE DRAWINGS

FIG. 3 is a front elevational view of an embodiment of a sporting trophy in accordance with the present invention.

FIG. 4 is a cross-sectional view along line 4-4 of FIG. 7.

FIG. 5 is a cross-sectional view along line 5-5 of FIG. 7.

FIG. 6 is a flow diagram chart illustrating an embodiment of the present invention comprising authenticating image data obtained from a sporting trophy.

FIG. 7 is a flow diagram illustrating an embodiment of the present invention utilizing a CAT scan.

DETAILED DESCRIPTION OF THE PREFERRED EMBODIMENTS

Figure 1:
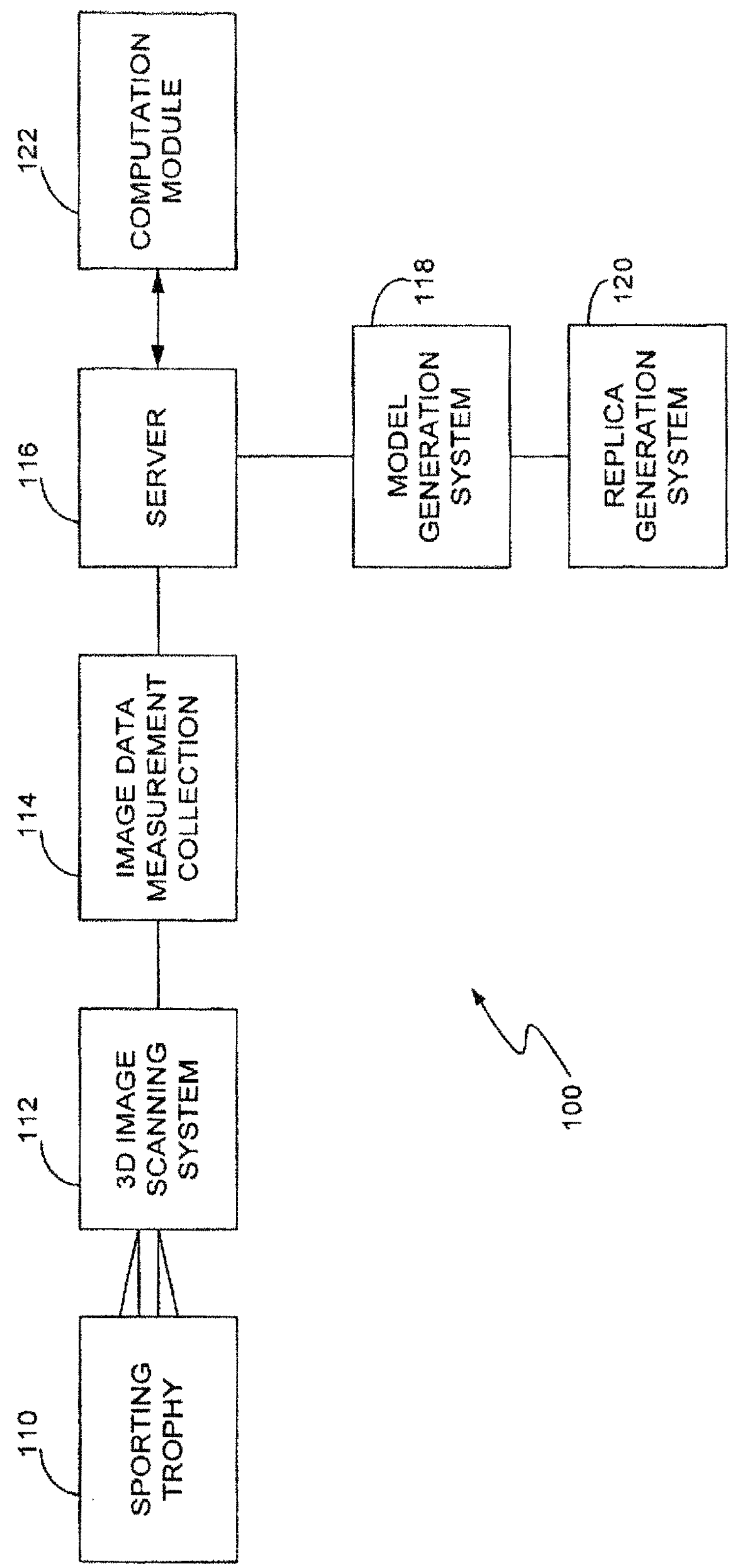
FIG. 1 is a block diagram of a system for obtaining digital data indicative of a sporting trophy.

In accordance with one embodiment of the present invention, FIG. 1 illustrates a system 100 pertaining to the imaging, reproduction and/or analysis of sporting trophy 110. It should be understood and appreciated that sporting trophies can be any animal that has been hunted, fished, or trapped or any portion of the animal, such as antlers, skulls, and horns. Examples of sporting trophies include, but are not limited to, those recognized and described by the Safari Club International and the Boone and Crocket Club. For the purpose of economizing description of aspects of the present invention, many embodiments described herein will be discussed in the context of imaging, measurement, and reproduction of deer antlers In accordance with one aspect of the present invention, 3D image scanning system 112 creates a 3D representation of sporting trophy 110. In one embodiment, image scanning system 112 comprises a machine or service, such as those offered by ShapeGrabber, Inc., enabling a free-formed scan of surfaces associated with sporting trophy 110. Accordingly, a 3D representation of trophy 110 is generated. However, it is important to note that any suitable system can be employed to obtain 3D image data of sporting trophy 110.

After sporting trophy 110 has been reduced to digital image form, image data measurement 114 produces and collects precise measurements of the sporting trophy based on the image data. In accordance with one embodiment, a 3D grid is constructed around the sporting trophy in order to provide a context for precise measurement. In one embodiment, the grid is divided into measurement portions that are hundredths of an inch to scale.

In accordance with another embodiment of the present invention, after the image data has been collected, the image data is stored on a computerized server 116 for access as needed. Server 116 is one example of the three-dimensional image data being stored on a computer-readable medium. Other examples include storing the data on media such as a CD-ROM, or a memory stick, for example. In one aspect, the data on server 116 is accessible from remote locations, such as over the Internet. In another aspect, computation module 122 catalogs and ranks the image data in the context of previously stored data associated with other sporting trophies. For example, the sporting trophy can be ranked based on size or quality of incorporated features. Different sets of rankings can be generated for different categories such as geography, age of hunter, and the like. Further, the ranking of the antlers can be based, at least in part, on a selected scoring system.

In accordance with another embodiment of the present invention, the image data (or corresponding data derived therefrom) is supplied to a model generation system 118. Model generation is a machine or other suitable system that creates a model representation based on the image data. For example, distilled data, such as a vectorized representation of the sporting trophy in three-dimensional space using polar coordinates, can be generated based on the 3D image data. That distilled data, or the image data itself, can be provided to replica generation system 120, such as a Computer Numerically Controlled (CNC) cutting system in order to carve or otherwise machine a highly accurate replica of the originally scanned sporting trophy. In one aspect, the image data is copied from server 116 and provided to system 120 to create a replica of the subject of the image data. Although a CNC machine is described herein, it should be understood and appreciated that any suitable device known in the art can be used for providing the replica of the sporting trophy, such as plastic molding devices, plasma cutters and the like, can be employed in accordance with embodiments of the present invention.

It should be understood and appreciated that the replicas created by the replica generation system 120 can be fabricated from various materials of construction known in the art, such as plastic, gold, silver, platinum, plaster, marble, and combinations thereof. It should also be understood and appreciated that the replicas created by the replica generation system 120 can vary in size relative to the sporting trophy 110, such as substantially the same size, miniature, or any size there between. In one embodiment of the present invention, the replica can be substantially the same size as the sporting trophy 110. In another embodiment of the present invention, the replica can be a miniature of the sporting trophy 110. In one embodiment of the present invention, the miniature is less than about 50% of the size of the sporting trophy. In another embodiment, the miniature is less than about 10% of the size of the sporting trophy. The miniature replicas can be used as a number of different products. For example, the miniature replicas can be novelties, figurines, tie tacks, paper weights, card holders, and the like.

In accordance with another embodiment of the present invention, model generation system 118 can be utilized to correct damage or other imperfections in sporting trophy 110. In some instances, the sporting trophy may be damaged during the hunt or under other circumstances. For example, in the context of fishing, a fish may have been injured (e.g., bit by another fish) resulting in exterior blemishes. In these instances, the sporting trophy is less appealing or desirable because it is not in a pristine condition. Accordingly, model generation 118 may utilized to digitally correct flaws in the digital image of sporting trophy 110 before replica generation system 120 creates a replica of sporting trophy 110.

In accordance with another embodiment of the present invention, the 3D digital representation (or a corresponding data set based thereon) is provided to the replica generation system 120 (e.g., a CNC (or another) machine) in order to create a negative 3D replica of the originally scanned object. In one embodiment of the present invention, a mold can be formed in a block of material. These molds can be utilized to create a synthetic representation for any purpose such as, but not limited to, the creation of candles in the shape of the antlers. In another embodiment, the negative 3D replica can be provided in a transparent or substantially transparent material, such as glass, plastic, crystal, and the like. An example of the negative 3D replica provided in the transparent or substantially transparent material is a laser enhanced crystal containing the negative 3D replica therein. It should be understood and appreciated that the negative 3D replica can be put into any transparent or substantially transparent material by any method known in the art, such as laser engraving. Similar to the replicas described herein, it should also be understood and appreciated that the negative 3D replicas can be any size relative to the original sporting trophy 110, such as substantially the same size, miniature, or any size there between.

Figure 2:
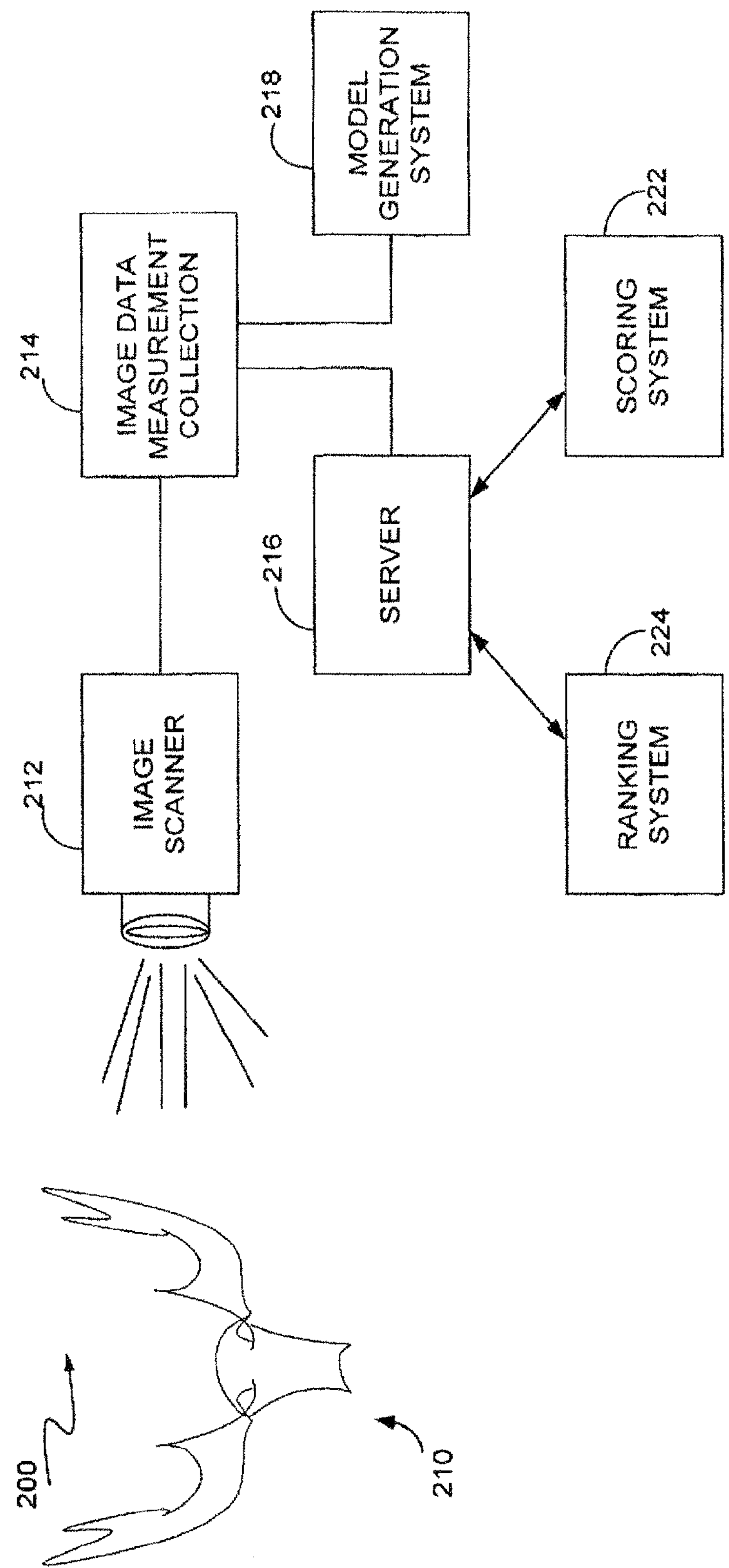
FIG. 2 is a block diagram illustrating a system for obtaining digital data indicative of a set of antlers.

FIG. 2 illustrates system 200 for the imaging, reproduction and/or analysis of deer antlers in accordance with one embodiment of the present invention. Antlers 210 are scanned by image scanner 212 and the resultant 3D image data are supplied to image data measurement and collection system 214. The image data corresponding to antlers 210 can be supplied to model generation system 218. Model generation is, illustratively, substantially similar to model generation system 118 described in the context of FIG. 1. In one embodiment, model generation system 218 is used to create a substantially exact replica of antlers 210. In one example, the antlers of the World Record Whitetail Deer are scanned in order to create a corresponding 3D image data set (e.g., an image data set accurate down to a hundredth of an inch relative to the original antler). The image data (or a corresponding set of image data) can be provided to a cutting machine, or other suitable machine, which is programmed to create a model of the originally provided antler.

In accordance with one embodiment of the present invention, the described duplication process will enhance the enjoyment of "shed hunting." Deer shed their antlers every year and it is common for people to hunt the sheds. If an individual who is shed hunting finds a large single of a pair of antlers, it becomes desirable for the individual to create a synthetic model of the other side of the pair of antlers. In this situation model generation system 218 can be utilized to reduce the found single antler to a 3D representation. That image data is then manipulated in order to create a data set that represents a relative mirror image representation of the originally scanned side of the found single antler. For example, if the individual found a right-hand side antler, a 3D data representation is produced for the left-hand side antler. Once an image data set has been created for the missing antler, the data can be utilized to create a model of the missing antler, or of the entire rack.

As discussed above, in the context of hunting, fishing, and other sports involving the capture or taking of animals, many systems are implemented to score, rank, and/or categorize sporting trophies. For instance, deer antlers are ranked by systems such as the Boone and Crocket and the Pope and Young Score Charts. In accordance with one embodiment of the present invention, the image data corresponding to antlers 210 are supplied to server 216. Server 216 may be any suitable computing system, implemented over a network or locally, for performing computation, sorting, and/or analysis of the image data. In one embodiment, scoring system 222 is utilized to implement a desired scoring system (e.g., Boone and Crocket Score Chart, Pope and Young Score Chart). It is important to note that any suitable scoring systems, such as simple size and weight measurements, are within the scope of the present invention. Additionally, specific sporting trophy measurements and scoring calculations can be performed using computed total volumetric displacement calculations in addition to or in lieu of standard linear measurements. This automated total volumetric calculation can be performed with respect to any suitable sporting trophy and is not limited to antlers of horned animals. It should be understood and appreciated that any suitable method can be used to calculate the total volumetric displacement.

Typically, the standard linear measurements of a sporting trophy are acquired by employing a measuring device, such as a measuring tape, and measuring predetermined external portions, such as those recognized by the Safari Club International and the Boone and Crocket Club, of the sporting trophies by hand. The lengths of the predetermined external portions of the sporting trophies are combined to provide an overall score for the sporting trophies. Measuring the predetermined external portions of the sporting trophies by hand provides a relatively subjective manner of measuring, which can lead to inconsistencies in the measurements.

In accordance with another embodiment of the present invention, the scoring system 222 provides a universal measuring system for providing consistent linear measurements of sporting trophies. Referring now to FIG. 3, shown therein is a sporting trophy 310 having a first horn 312 and a second horn 314. The first and second horns 312 and 314 have at least one internal length 316 and 318, respectively. It should be understood and appreciated that the sporting trophy can be any sporting trophy described herein and is not limited to horns like those shown in FIG. 3. Generally, the internal lengths extend along predetermined portions of a sporting trophy. For example, the predetermined portions of the sporting trophy 310 shown in FIG. 3 extend from a base portion 320 of the sporting trophy 310 to a first end portion 322 of the first horn 312 and from the base portion 320 to a second end portion 324 of the second horn 314. The scoring system 222 consistently measures the internal lengths 316 and 318 along predetermined portions of the sporting trophy.

The scoring system 222 provides consistent measurements of the internal lengths 316 and 318 of the sporting trophy 310. The scoring system 222 provides the internal lengths 316 and 318 of the sporting trophies 310 disposed at the substantial center of any given cross-section perpendicular to the predetermined portion of the sporting trophy 310. Referring now to FIGS. 4 and 5, shown therein are cross-sections 326 and 328 of the first horn 312 of the sporting trophy 310. The cross-sections 326 and 328 of the first horn 312 show the internal lengths 316 and 318 substantially disposed at the center of the cross-sections 326 and 328. It should be understood and appreciated that any perpendicular cross-section taken along the predetermined portions of the sporting trophies has the internal lengths disposed substantially in the center. It should be understood and appreciated that the internal lengths measured by the scoring system 222 can be subjected to a net measurement system or a gross measurement system, such as those implemented by the Safari Club International and the Boone and Crocket Club.

In accordance with another embodiment of the present invention, the surface area of the sporting trophies is determined and provided by the scoring system 222 as an additional scoring parameter. The surface area can be used to score the sporting trophies in addition to or in lieu of either standard linear measurements and/or total volumetric calculation. It should be understood and appreciated that the surface area can be determined by any method known in the art for determining the surface area of a 3D image of a sporting trophy. It should also be understood and appreciated that the scoring system 222 can use standard linear measurements of the sporting trophy, the volumetric displacement of the sporting trophy, the surface area of the sporting trophy, or any combination thereof to score the sporting trophies.

In accordance with another embodiment of the present invention, the weight of the sporting trophies is determined and provided to the scoring system 222 as an additional scoring parameter. It should be understood and appreciated that the density of the sporting trophy can be determined from the volume and the weight and be used as an additional scoring parameter. The weight can be used to score the sporting trophies in addition to or in lieu of the standard linear measurements, the surface area and/or the total volumetric calculation. It should also be understood and appreciated that the scoring system 222 can use standard linear measurements of the sporting trophy, the volumetric displacement of the sporting trophy, the surface area of the sporting trophy, the weight of the sporting trophy, the density of the sporting trophy, or any combination thereof to score the sporting trophies.

In accordance with another embodiment of the present invention, ranking system 224 enables a wider range of scoring of sporting trophies. Ranking system 224 can be locally implemented and provides ranking services for antlers that have been scanned by the same image scanner. However, ranking system 224 can also be implemented over a network, such as the Internet, to provide ranking services for large geographic area (e.g., county, state).

In accordance with yet another embodiment of the present invention, data can be divided into any of a number of subclasses including state-by-state results, or for sporting categories such as 3/3, 4/4, 5/5, etc. Rankings can be provided on an Internet site that can be accessed by the public at large. In one embodiment, a centralized entity is responsible for the website and is the official organization for recording results. That organization creates the digital image representations for record keeping purposes. For example, the organization can provide an indication of a record for the largest 3/3, 4/4, 5/5, etc. in each individual state. In one embodiment, the record holder in each class in each state is provided with a reward. Given the centralized record keeping, there becomes an incentive for a hunter to bring his or her trophy to the organization for imaging and accurate measurement.

In accordance with one embodiment of the present invention, obtaining image data corresponding to a 3D scanned sporting trophy includes authenticating the image data. Illustrated in FIG. 6, a sporting trophy 410 is scanned and image data is obtained, as indicated at block 412. Image authentication 414 is created and issued relative to the digital image data of sporting trophy 410. Authentication can take any suitable form. Authentication may be as simple as placing a computer-readable medium containing the three-dimensional image data in a sealed package, which package is used to indicate authenticity. Additionally, the authentication can be provided in the form of digital data stored on the computer-readable medium. Yet another form of authentication can be provided by encrypting the three-dimensional data, and controlling access to keys for decryption to allowed persons such as the sportsman and/or approved taxidermists. Image data storage 416 may include storing the image authentication information along with the corresponding image data. In one embodiment, when the sportsman brings his or her sporting trophy for imaging and recordal, they are provided with a certificate of authenticity issued by the scanning entity. The certificate can include an image of the antlers along with information pertaining to the responsible hunter (e.g., social security number, hunting license number, etc) as well as relevant scanning data such as the date and time of scanning, machine used for scanning, technician information who performed the scan, etc.

It is believed that taxidermists may collectively form an alliance and an agreement to not mount antlers for hunters who do not have a certificate of authentication. This may even reduce poaching. In one aspect, even if the antlers were mounted by a taxidermist who does not require an authenticity certificate, purchasers of antlers will become accustomed to requiring certificates for enhanced value. In the long run, antlers not associated with a certificate will lose their value. The organization that issues these certificates of authenticity will be able to reissue certificates if necessary (e.g., if lost or stolen).

FIG. 7 is a diagrammatic view of a system that can be utilized to create a 3D image based on multiple two-dimensional ("2D") images in accordance with one embodiment of the present invention. First, a CAT (Computed Axial Tomography) scanned image 512 is conducted of a sporting trophy 510. A CAT scan involves using computers to generate multiple flat, (i.e., two-dimension) x-ray images one slice at a time. The multiple 2D images are collected (step 514) and used to generate a 3D image (step 516). The CAT scan images can be utilized to support a sportsmen-oriented scoring system based on bone structure, or any other suitable internal structure of the trophy. In one embodiment, such a process may be utilized for the scoring of fish. The image data generated from a CAT scan image can be utilized for any of the purposes described above in relation to the scanning equipment provided by ShapeGrabber Inc. For example, CAT scan images can be utilized as the basis for creating model representations of scanned objects. The scans can also be utilized for measurement purposes, the measurements being utilized in a record keeping system such as the ones described above in accordance with aspects of the present invention.

Figure 8:
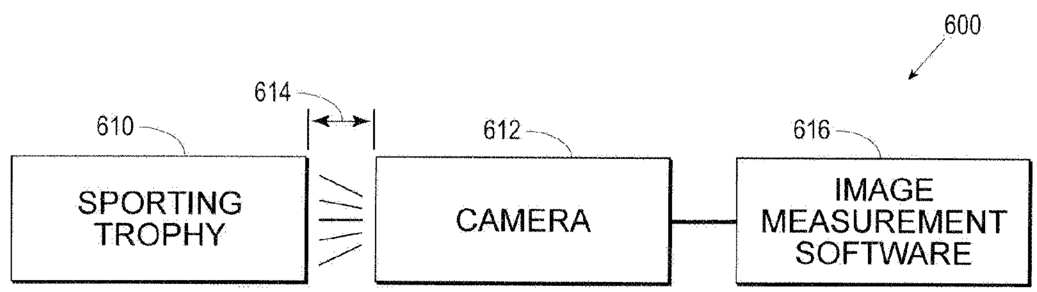
FIG. 8 is a block diagram illustrating an embodiment of the present invention utilizing a camera.

In another embodiment of the present invention, measurements are collected based on a plurality of two-dimensional images. FIG. 8 is a diagrammatic view of a camera 612 provided with a laser range finder. Camera 612 may be any suitable device or system for acquiring an image of sporting trophy 610. When a two-dimensional image of a target, illustratively sporting trophy 610, is collected, the distance 614 of camera 612 from the target is simultaneously obtained form the range finder. In accordance with one embodiment, image measurement software 614 can then be applied to measure an element in the picture (e.g., score a set of antlers) based, in part, on the distance 614 from the target 610. For example, if a hunter is standing six feet away from a target and takes a picture, the range finder will determine that the hunter is six feet away. The software can then analyze a picture taken by the hunter in the context of the distance from the target in order to produce a relatively exact measurement of something within the picture (e.g., the antlers).

In accordance with one embodiment of the present invention, the sportsman submits the sporting trophy (e.g. antlers) to a computerized imaging system. In some cases this may be convenient where the sportsman can simply bring the sporting trophy to the location of a scanning apparatus. However, in other situations, the sportsman and the scanning apparatus may be located hundreds if not thousands of miles from each other.

Figure 9:
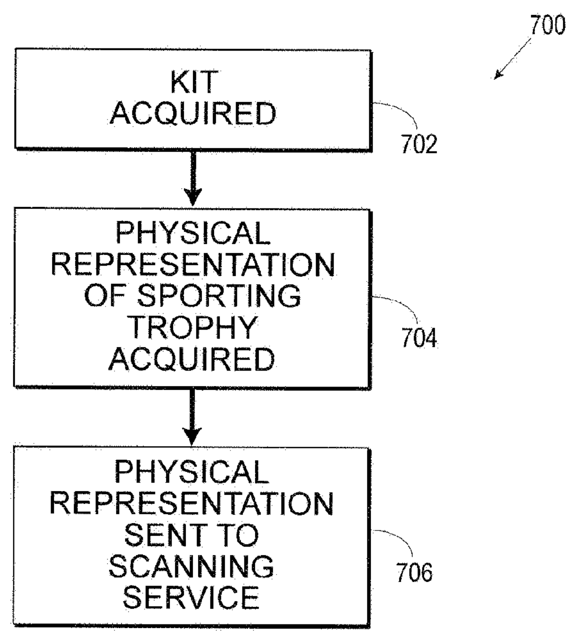
FIG. 9 is a flow chart illustrating an embodiment of the present invention utilizing a kit to acquire a physical representation of a sporting trophy.

FIG. 9 is a flow diagram of providing sporting trophy information to a scanning authority in accordance with an embodiment of the present invention. At block 702, a sportsman obtains a kit for acquiring a physical representation of a sporting trophy. The kit may comprise any means for creating a suitable representation of a sporting trophy. In one embodiment, the kit facilitates creation of a negative mold of the sporting trophy. For example, in one embodiment, the sportsman is provided with a molding compound and instructions to create a two-part kit that can form around the sporting trophy to generate a negative image thereof. In another embodiment, the kit includes a camera similar to that illustrated in FIG. 8. At block 704, the sportsman utilizes the kit to create a physical representation of the sporting trophy. Block 704 can include the mixing or preparation of the molding compound; placement of the sporting trophy within the prepared molding compound; and caring of the molding compound; and curing of the molding compound. The physical representation (e.g., the hardened or cured negative image of the sporting trophy) can then be shipped to the scanning entity, as indicated at block 706 without requiring the sportsman to part with his or her sporting trophy. Those skilled in the art will recognize that other methods and techniques for providing a physical representation of the sporting trophy to the scanning entity can be provided as well.

Although the present invention has been described with reference to preferred embodiments, workers skilled in the art will recognize that changes may be made in form and detail without departing from the spirit and scope of the invention.

What is claimed is:

1. A method for scoring a sporting trophy, comprising the steps of:

engaging a computerized scanner to enable a free-formed scan of surfaces associated with a sporting trophy;

generating three-dimensional digital data indicative of the sporting trophy, the sporting trophy having a volume and a surface area, the three-dimensional image data being a three-dimensional representation of the sporting trophy;

storing the three-dimensional image data on a computer readable medium;

generating a three-dimensional grid around the three-dimensional representation of the sporting trophy to provide a context for precise measurement;

providing at least one sporting-relevant measurement based on the three-dimensional data of the sporting trophy; and providing a score of the sporting trophy based on the at least one sporting-relevant measurement.

2. The method of claim 1 further comprising the step of calculating the volume of the sporting trophy.

3. The method of claim 2 further comprising the step of calculating the surface area of the sporting trophy.

4. The method of claim 2 wherein the score of the sporting trophy is based on the volume of the sporting trophy and the at least one sporting-relevant measurement.

5. The method of claim 3 wherein the score of the sporting trophy is based on the surface area of the sporting trophy and the at least one sporting-relevant measurement.

6. The method of claim 4 wherein the score of the sporting trophy is based on volume of the sporting trophy, the surface area of the sporting trophy and the at least one sporting-relevant measurement.

7. The method of claim 2 wherein the score of the sporting trophy is a combination of the volume of the sporting trophy and the at least one sporting relevant measurement.

8. The method of claim 6 wherein the score of the sporting trophy is a combination of the volume of the sporting trophy, the surface area of the sporting trophy, and the at least one sporting relevant measurement.

9. The method of claim 1 wherein the at least one sporting-relevant measurement is an internal length of a predetermined portion of the sporting trophy.

10. A system for scoring a sporting trophy, comprising:

a scanner configured to scan a sporting trophy in three dimensions and provide three-dimensional image data, the sporting trophy having a volume and a surface area, the three-dimensional image data being a three-dimensional representation of the sporting trophy;

a three-dimensional grid generated around the three-dimensional representation of the sporting trophy to provide a context for precise measurement; and a scoring system to provide at least one sporting-relevant measurement based on the three-dimensional data of the sporting trophy and a score of the sporting trophy based on the at least one sporting-relevant measurement.

11. The system of claim 10 further comprising:

a server coupled to the scanner, the server being configured to calculate the at least one sporting-relevant measurement based on the three-dimensional data of the sporting trophy.

12. The system of claim 10 wherein the scoring system calculates the volume of the sporting trophy.

13. The system of claim 12 wherein the scoring system also calculates the surface area of the sporting trophy.

14. The system of claim 12 wherein the score of the sporting trophy is based on the volume of the sporting trophy and the at least one sporting-relevant measurement.

15. The system of claim 13 wherein the score of the sporting trophy is based on the surface area of the sporting trophy and the at least one sporting-relevant measurement.

16. The system of claim 13 wherein the score of the sporting trophy is based on volume of the sporting trophy, the surface area of the sporting trophy and the at least one sporting-relevant measurement.

17. The system of claim 12 wherein the score of the sporting trophy is a combination of the volume of the sporting trophy and the at least one sporting relevant measurement.

18. The system of claim 13 wherein the score of the sporting trophy is a combination of the volume of the sporting trophy, the surface area of the sporting trophy, and the at least one sporting relevant measurement.

19. The system of claim 10 wherein the at least one sporting-relevant measurement is an internal length of a predetermined portion of the sporting trophy.

* * * * *